US011295435B2

(12) United States Patent
Liu et al.

(10) Patent No.: US 11,295,435 B2
(45) Date of Patent: Apr. 5, 2022

(54) PRODUCT DEFECT DETECTION METHOD, DEVICE AND SYSTEM

(71) Applicant: GOERTEK INC., Shandong (CN)

(72) Inventors: Jie Liu, Shandong (CN); Jifeng Tian, Shandong (CN); Wenchao Zhang, Shandong (CN); Yifan Zhang, Shandong (CN)

(73) Assignee: GOERTEK INC., Shandong (CN)

(*) Notice: Subject to any disclaimer, the term of this patent is extended or adjusted under 35 U.S.C. 154(b) by 0 days.

(21) Appl. No.: 17/250,262

(22) PCT Filed: Aug. 29, 2020

(86) PCT No.: PCT/CN2020/112313
§ 371 (c)(1),
(2) Date: Dec. 22, 2020

(87) PCT Pub. No.: WO2021/135331
PCT Pub. Date: Jul. 8, 2021

(65) Prior Publication Data
US 2021/0374940 A1 Dec. 2, 2021

(30) Foreign Application Priority Data
Dec. 30, 2019 (CN) .......................... 201911401998.5

(51) Int. Cl.
G06T 7/00 (2017.01)
G06K 9/64 (2006.01)
G06K 9/62 (2022.01)

(52) U.S. Cl.
CPC .......... G06T 7/0004 (2013.01); G06K 9/6257 (2013.01); G06K 9/6265 (2013.01);
(Continued)

(58) Field of Classification Search
None
See application file for complete search history.

(56) References Cited

U.S. PATENT DOCUMENTS 5,987,094 A 11/1999 Clarke et al.
8,705,839 B2 * 4/2014 Zhang ..................... G06T 7/194
382/144
(Continued)

FOREIGN PATENT DOCUMENTS

CN 105869154 A 8/2016
CN 109858327 A 6/2019
(Continued)

Primary Examiner — David Perlman
(74) Attorney, Agent, or Firm — LKGlobal | Lorenz & Kopf, LLP

(57) ABSTRACT

A product defect detection method, device and system are disclosed. The method comprises: constructing a defect detection framework including segmentation networks, a concatenating network and a classification network, and setting a quantity of the segmentation network according to product defect types, wherein each segmentation network corresponds to a defect type; concatenating the sample image with the mask image output by each segmentation network by using the concatenating network to obtain a concatenated image; training the classification network by using the concatenated images to obtain a classification network capable of correctly identifying a product defect and a defect type; and when performing product defect detection, inputting a product image acquired into the defect detection framework, and detecting a product defect and a defect type existing in the product by using the segmentation networks, the concatenating network and the classification network.

20 Claims, 4 Drawing Sheets

(52) U.S. Cl.
CPC .. *G06K 9/6279* (2013.01); *G06T 2207/20084* (2013.01); *G06T 2207/30108* (2013.01)

(56) References Cited

U.S. PATENT DOCUMENTS

| | | | | |
|---|---|---|---|---|
| 2014/0050387 | A1* | 2/2014 | Zadeh | G06T 7/0004 |
| | | | | 382/141 |
| 2018/0322366 | A1* | 11/2018 | Lim | G06K 9/6255 |
| 2020/0175669 | A1* | 6/2020 | Bian | G06T 7/0004 |
| 2021/0089833 | A1* | 3/2021 | Anantha | G06K 9/00711 |

FOREIGN PATENT DOCUMENTS

| | | |
|---|---|---|
| CN | 110232675 A | 9/2019 |
| CN | 111179253 A | 5/2020 |

* cited by examiner

PRODUCT DEFECT DETECTION METHOD, DEVICE AND SYSTEM

CROSS REFERENCE TO RELATED APPLICATIONS

This Application is a U.S. National Stage entry under 35 U.S.C. § 371 based on International Application No. PCT/CN2020/112313, filed on Aug. 29, 2020, which claims priority to Chinese Patent Application No. 201911401998.5, filed on Dec. 30, 2019. These priority applications are hereby incorporated herein in their entirety by reference.

TECHNICAL FIELD

This Application pertains to a product defect detection method, device and system.

BACKGROUND

In the traditional precision manufacturing industry, product defect detection is generally completed by manual inspection. In a typical manufacturing plant, nearly 30% of the employees are inspection personnel. Due to the large labor demand, there is often a shortage of human resources; moreover, the work intensity of manual inspection is high, and the inspection quality is easy to fluctuate due to fatigue. Therefore, automated inspection solutions of machines that have stable inspection quality, consistent results, and are not affected by human factors will surely be welcomed by the precision manufacturing industry. In addition, other objects, desirable features and characteristics will become apparent from the subsequent summary and detailed description, and the appended claims, taken in conjunction with the accompanying drawings and this background.

SUMMARY

The objective of the embodiments of the present disclosure is to provide a product defect detection method, device and system.

According to an aspect of the present disclosure, a product defect detection method is provided. The method comprises:

constructing a defect detection framework including segmentation networks, a concatenating network and a classification network, and setting a quantity of the segmentation networks according to product defect types, wherein each segmentation network corresponds to a defect type;

training the segmentation networks by using a sample image of a product containing different defect types to obtain a segmentation network of a mask image capable of locating a position of each type of defect;

concatenating the sample image with the mask image output by each segmentation network by using the concatenating network to obtain a concatenated image;

training the classification network by using the concatenated image to obtain a classification network capable of correctly identifying a product defect and a defect type; and when performing product defect detection, inputting a product image acquired into the defect detection framework, and detecting a product defect and a defect type existing in the product by using the segmentation networks, the concatenating network and the classification network.

According to another aspect of the present disclosure, a product defect detection device is provided. The device comprises:

a preprocessing unit configured to construct a defect detection framework including segmentation networks, a concatenating network and a classification network, and set a quantity of the segmentation networks according to product defect types, wherein each segmentation network corresponds to a defect type; train the segmentation network by using a sample image of a product containing different defect types to obtain a segmentation network of a mask image capable of locating a position of each type of defect; concatenate the sample image with the mask image output by each segmentation network by using the concatenating network to obtain a concatenated image; and train the classification network by using the concatenated image to obtain a classification network capable of correctly identifying a product defect and a defect type; and a defect detection unit configured to, when performing product defect detection, input a product image acquired into the defect detection framework, and detect a product defect and a defect type existing in the product by using the segmentation networks, the concatenating network and the classification network.

According to yet another aspect of the present disclosure, a product defect detection system is provided. The system comprises: a memory and a processor;

the memory stores computer executable instructions;

when the computer executable instructions are executed, the processor executes the product defect detection method.

According to still yet another aspect of the present disclosure, a computer readable storage medium is provided. One or more computer programs are stored on the computer readable storage medium, and the product defect detection method is implemented when the one or more computer programs are executed.

The present disclosure can achieve at least the following technical effects: There are often multiple types of defects in images of flawed products. Automatic defect detection algorithms based on machine learning can detect defects in images of flawed products including multiple types of defects, however, the algorithms are large in scale, and a large data amount of sample images and large-scale algorithms are needed to perform training, so it is difficult for this defect detection method to meet the needs of the situation when the flawed products on the production line are relatively few. With respect to this problem in product inspection, in the present embodiment, the product defect detection framework is constructed using multiple segmentation networks, a concatenating network and a classification network, the segmentation network capable of accurately locating the position of a defect type can be obtained by training with images of a small sample only, then the sample image obtained is concatenated with the segmentation network where each defect is located by using the concatenating network, and a small-scale classification network having a good classification capability can be trained with a small number of concatenated images. In this way, when performing defect detection on the product image, first, the mask images are obtained through the segmentation networks after trained, and the mask images are used to highlight the image regions where various defects may exist, and then the mask image and the product image are concatenated together so that the classification network after trained can identify defects more easily, thereby improving the accuracy of identifying the defect type.

BRIEF DESCRIPTION OF DRAWINGS

The present invention will hereinafter be described in conjunction with the following drawing figures, wherein like numerals denote like elements, and.

DETAILED DESCRIPTION

Figure 1:
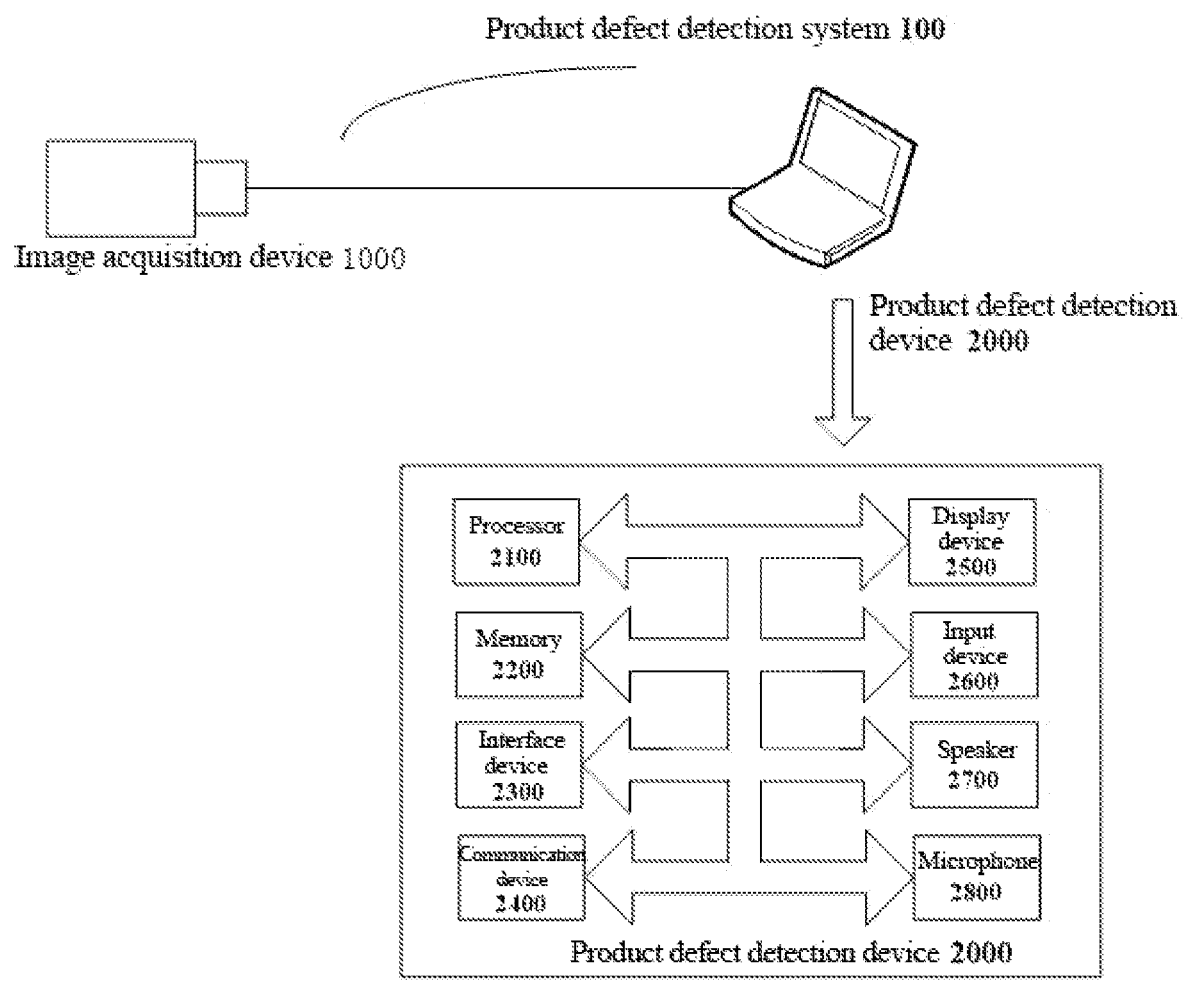
FIG. 1 is a block diagram of the hardware configuration of a product defect detection system according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

Now, various embodiments of the present disclosure will be described in detail with reference to the drawings. It should be noted that, unless otherwise specified, the relative arrangements of the members and steps, mathematical formulas and numerical values described in these embodiments do not limit the scope of the present disclosure.

The following description of at least one embodiment is actually for illustrative purposes only, and is not intended to limit the present disclosure and application or use thereof in any way.

The techniques, methods and devices well known to a person skilled in the related arts may not be discussed in detail. However, when applicable, such techniques, methods and devices should be deemed as a part of the description.

In all the examples shown and discussed herein, any specific value should be interpreted as illustrative only rather than restrictive. Therefore, other examples in the embodiments may have different values.

It should be noted that similar reference numerals and letters in the following drawings represent similar items. Therefore, once an item is defined in a drawing, it may not be further discussed in the subsequent drawings.

First Embodiment

FIG. 1 is a block diagram of the hardware configuration of a product defect detection system 100 according to an embodiment of the present disclosure.

As shown in FIG. 1, the product defect detection system 100 comprises an image acquisition device 1000 and a product defect detection device 2000.

The image acquisition device 1000 is configured to acquire a product image and provide the acquired product image to the product defect detection device 2000.

The image acquisition device 1000 may be any imaging device capable of taking pictures, such as a camera, etc.

The product defect detection device 2000 may be any electronic device, such as a PC, a notebook computer, a server, etc.

In the present embodiment, referring to FIG. 1, the product defect detection device 2000 may comprise a processor 2100, a memory 2200, an interface device 2300, a communication device 2400, a display device 2500, an input device 2600, a speaker 2700, a microphone 2800, etc.

The processor 2100 may be a mobile version processor. The memory 2200 includes, for example, ROM (Read Only Memory), RAM (Random Access Memory), nonvolatile memory such as a hard disk, etc. The interface device 2300 includes, for example, a USB interface, a headphone interface, etc. The communication device 2400 can, for example, perform wired or wireless communication. The communication device 2400 may include short-range communication devices, for example, any device that performs short-range wireless communication based on a short-range wireless communication protocol such as Hilink protocol, WiFi (IEEE 802.11 protocol), Mesh, Bluetooth, ZigBee, Thread, Z-Wave, NFC, UWB, LiFi, etc. The communication device 2400 may also include a remote communication device, for example, any device that performs WLAN, GPRS, 2G/3G/4G/5G remote communication. The display device 2500 is, for example, a liquid crystal display, a touch screen, etc. The display device 2500 is configured to display the product image acquired by the image acquisition device 1000. The input device 2600 may include, for example, a touch screen, a keyboard, etc. The user can input/output voice information through the speaker 2700 and the microphone 2800.

In the present embodiment, the memory 2200 of the product defect detection device 2000 is configured to store instructions for controlling the processor 2100 to operate to at least execute the product defect detection method according to any embodiment of the present disclosure. A person skilled in the art can design instructions according to the solutions disclosed in the present disclosure. It is well known in the art how the instructions control the processor to operate, and thus will not be described in detail here.

Although multiple devices of the product defect detection device 2000 are shown in FIG. 1, the present disclosure may only involve some of them. For example, the product defect detection device 2000 only involves the memory 2200, the processor 2100 and the display device 2500.

In the present embodiment, the image acquisition device 1000 is configured to acquire a product image and provide it to the product defect detection device 2000, and the product defect detection device 2000 implements the product defect detection method according to any embodiment of the present disclosure based on the image.

It will be appreciated that, although FIG. 1 only shows one image acquisition device 1000 and one product defect detection device 2000, it does not mean to limit their respective quantities. The product defect detection system 100 may comprise a plurality of image acquisition devices 1000 and/or product defect detection devices 2000.

Second Embodiment

In the product manufacturing process, the products obtained often have various forms of defects due to factors such as instability of process, insufficient mechanical positioning accuracy and the environment in the plant, etc. In the early stage of product manufacturing, flawed samples are usually few, and it is difficult for classification algorithms based on big data and large models to meet the requirements of the production line.

With respect to the small sample problem as described above, the present embodiments of the present disclosure first uses an image segmentation algorithm to predict possible defects and their positions in the image and generates corresponding mask images, then concatenates the original image and the mask images, and inputs them into a classifier to realize the classification of different defects.

Figure 2:
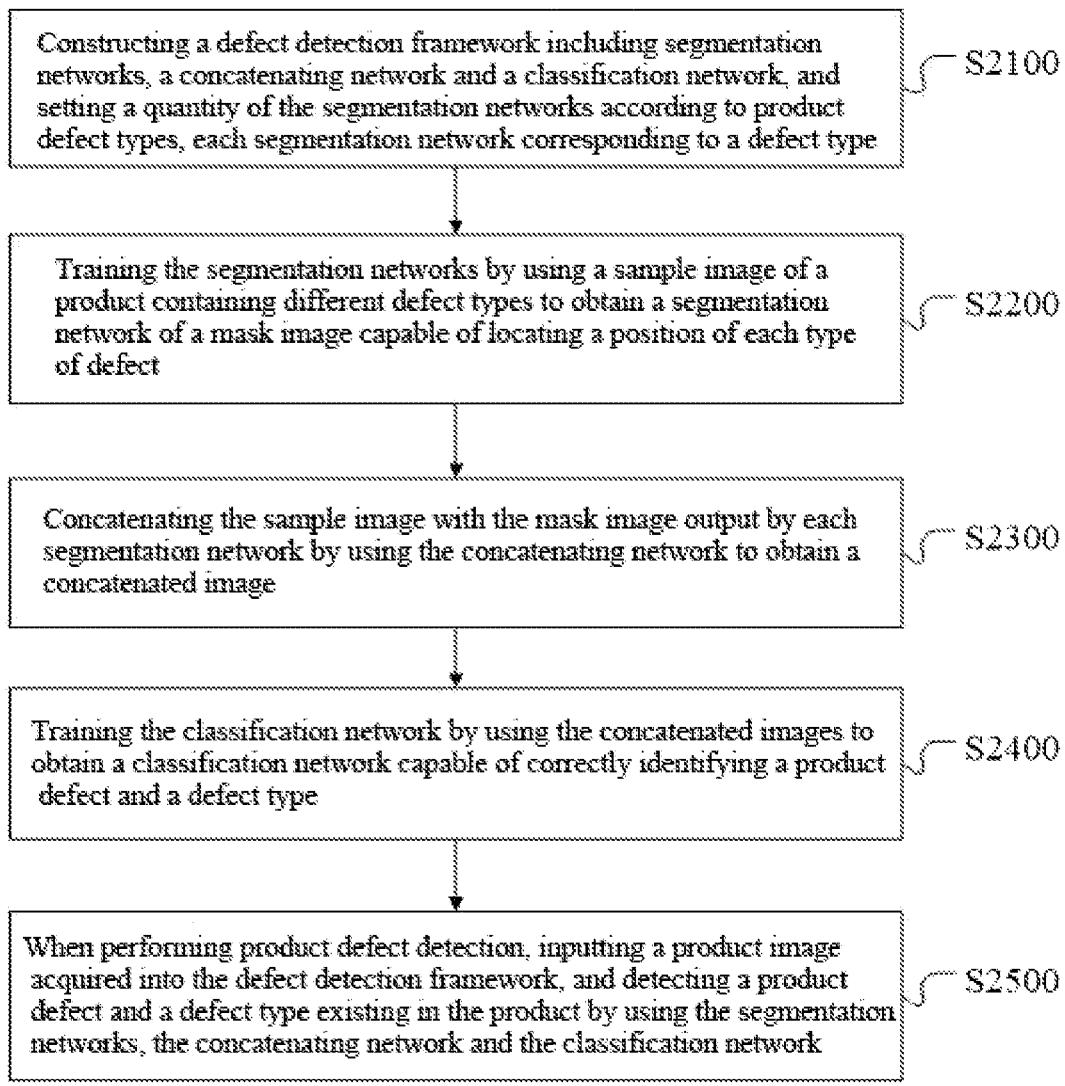
FIG. 2 is a flowchart of a product defect detection method according to an embodiment of the present disclosure.

FIG. 2 is a flowchart of a product defect detection method according to an embodiment of the present disclosure. As shown in FIG. 2, the method in the present embodiment comprises:

S2100: constructing a defect detection framework including segmentation networks, a concatenating network and a classification network, and setting a quantity of the segmentation networks according to product defect types, wherein each segmentation network corresponds to a defect type.

Figure 3:
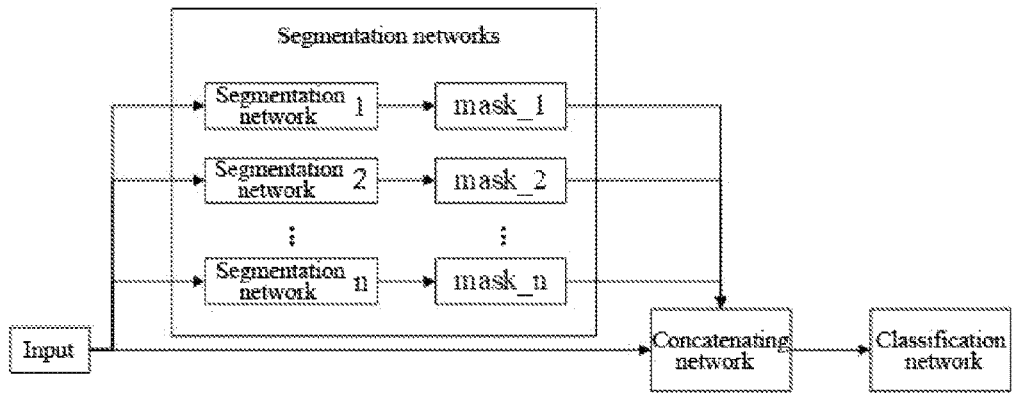
FIG. 3 is a schematic diagram of a defect detection framework according to an embodiment of the present disclosure.

In the present embodiment, as shown in FIG. 3, the segmentation networks, the concatenating network and the classification network are serially connected in sequence.

Among them, setting a quantity of the segmentation networks according to product defect types can be understood as: setting a quantity of the segmentation networks according to product defect types suitable for segmenting and locating by a segmentation algorithm.

Assuming that the product has m types of defects, in which n (n≤m, m and n are both natural numbers) types of defects can be segmented and located by a segmentation algorithm, and m-n types of defects are not suitable for segmenting and locating by a segmentation algorithm. Therefore, in the present embodiment, the quantity of the segmentation networks is set to n, which include segmentation network 1, segmentation network 2, . . . segmentation network n. These n segmentation networks can be realized by the same segmentation algorithm. The n segmentation networks form a parallel structure, and each segmentation network corresponds to and locates one type of defect among the m types of defects.

S2200: training the segmentation networks by using a sample image of a product containing different defect types to obtain a segmentation network of a mask image capable of locating a position of each type of defect.

In the present embodiment, an image of flawed products obtained in the early stage of the production line are acquired, and an image of flawed products suitable for locating defects by a segmentation algorithm are screened out as the sample image for training the segmentation network.

In some embodiments, the mask image is a binary image in which a pixel value of a region where a defect is located is the first value (for example, the pixel gray value is 255, and the normalized pixel gray value is 1), a pixel value of other regions is the second value (for example, the pixel gray value is 0). Alternatively, the mask image is a grayscale image in which a pixel value of a region where a defect is located is the pixel value of this region in the sample image, and a pixel value of other regions is the second value (value 0). The other regions are the regions in the binary image except the regions where a defect is located, namely, the other regions are the regions of the binary image where there is no defect.

S2300: concatenating the sample image with the mask image output by each segmentation network by using the concatenating network to obtain a concatenated image.

In the present embodiment, each sample image and multiple mask images obtained by segmenting the sample image using multiple segmentation networks are concatenated at the channel level. The size of the sample image and the mask image keep unchanged, and channels of the sample image are concatenated with channels of each mask image one by one, so that a quantity of channels of a concatenated image is equal to a sum of a quantity of channels of the sample image and a quantity of channels of all mask images.

Assuming that the pixel size of the sample image is 512*512, the quantity of channels is three, the sample image corresponds to i mask images, the pixel size of each mask image is 512*512, the quantity of channels of each mask image is one, and the i mask images have i channels in total, the sample image and the i mask images are concatenated at the channel level to obtain a concatenated image with a pixel size of 512*512 and a channel quantity of 3+i.

S2400: training the classification network by using the concatenated image to obtain a classification network capable of correctly identifying a product defect and a defect type.

The classification network in the present embodiment adopts a network with a relatively shallow residual (resnet), so that a classification network with good classification ability can be trained and obtained only by a small sample.

In S2500, when performing product defect detection, inputting a product image acquired into the defect detection framework, and detecting a product defect and a defect type existing in the product by using the segmentation networks, the concatenating network and the classification network.

There are often multiple types of defects in images of flawed products. Automatic defect detection algorithms based on machine learning can detect defects in images of flawed products including multiple types of defects, however, the algorithms are large in scale, and a large data amount of sample images and large-scale algorithms are needed to perform training, so it is difficult for this defect detection method to meet the needs of the situation when the flawed products on the production line are relatively few. With respect to this problem in product inspection, in the present embodiment, the product defect detection framework is constructed using multiple segmentation networks, a concatenating network and a classification network, the segmentation network capable of accurately locating the position of a defect type can be obtained by training with small sample images only, then the sample image obtained is concatenated with the segmentation network where each defect is located by using the concatenating network, and a small-scale classification network having a good classification capability can be trained with a small number of concatenated images. In this way, when performing defect detection on the product image, first, the mask image is obtained through the segmentation network after trained, and the mask image is used to highlight the image regions where various defects may exist, and then the mask image and the product image are concatenated together so that the classification network after trained can identify defects more easily, thereby improving the accuracy of identifying the defect type.

Third Embodiment

The embodiment of the present disclosure further provides a product defect detection method. In the present embodiment, in the above step S2200, training the segmentation networks respectively by using a sample image of a product containing different defect types comprises S2210-S2220:

S2210: inputting multiple sample images containing different defect types into multiple segmentation networks respectively.

In the present embodiment, the defect types contained in a sample image may be n or less than n, and the defect types contained in each sample image may be the same or different.

As shown in FIG. 3, a sample image containing n types of defects is input to n segmentation networks. All the n types of defects are defects that can be segmented and located using a segmentation algorithm. Each segmentation network outputs a mask image for locating a position of the defect, namely, the mask images mask_1, mask_2, . . . mask_n as shown in FIG. 3.

S2220, segmenting each type of defect in the sample image by using a parallel structure composed of multiple segmentation networks, and obtaining a mask image capable of locating a position of each type of defect.

In some embodiments, each segmentation network may use the Unet (Unity Networking) algorithm. The Unet algorithm includes a convolution part and an up-sampling part. The feature scale of the convolution part gradually decreases as the quantity of the convolution layers increases. The up-sampling part is used to restore the small-scale feature map generated by the convolution part to the original image size.

When training the segmentation network, first, n types of defects are marked according to the quantity n of types of separable defects. For example, in the sample image, a part corresponding to a defect is marked as a white pixel, and the part corresponding to a non-defect is marked as a black pixel, thereby forming binary label data. Then the Unet network is trained using the sample image and label data to obtain n segmentation networks after trained. Namely, the feature extraction and dimensionality reduction processing are performed on the sample image by using the convolution part of each segmentation network to obtain a feature image associated with a defect type, and the dimension increasing processing is performed on the feature image by using the up-sampling part of each segmentation network to obtain a mask image for locating the position of a type of defect in the sample image.

In some embodiments, in order to enhance the segmentation ability of the segmentation network for small-area defects, the segmentation network in the present embodiment adjusts the size of the original sample image according to a morphological feature of the product defect. For example, according to the area feature of the image region where the defect is located, the size of the sample image is set to a first preset size (for example, 512*512 pixels). The segmentation network is trained using the sample image having the first preset size, and the mask image output by the segmentation network has the first preset size.

Correspondingly, in order to improve the classification performance of the classification network, for example, to improve the rapid classification capability of the classification network, the image size is further adjusted using the concatenating network. For example, the size of the sample image and the mask image are set to the second preset size (for example, 256*256 pixels) according to the classification performance of the classification network. The sample image having the second preset size and the mask image having the second preset size are concatenated together, and the concatenated image is sent to the classification network for classification processing. The first preset size is greater than the second preset size.

In this way, in the present embodiment, a segmentation network that can accurately locate the position of each type of defect can be obtained by small sample training through the steps S2210~S2220.

Fourth Embodiment

The embodiment of the present disclosure further provides a product defect detection method. In the present embodiment, in the above step S2300, training the classification network by using the concatenated image to obtain a classification network capable of correctly identifying a product defect and a defect type further comprises S2310:

S2310: constructing a classification network including a residual unit (res unit, which includes a convolutional layer) for feature extraction, a pooling layer for reducing a size of a feature map (max pooling), a flatten layer for reducing a dimension of a multi-dimensional feature map into a row vector, a fully connected layer (fc) for adjusting a row vector to a column vector, and a logistic regression layer (softmax) for logical judgment. Among them, a predetermined quantity of serially connected residual units are set, each residual unit is connected to a pooling layer, and a pooling layer connected to a final residual unit is a global average pooling layer; an input of the flatten layer is set to be connected to an output of the global average pooling layer; an input of the fully connected layer is set to be connected to an output of the flatten layer; and an input of the logistic regression layer is set to be connected to an output of the fully connected layer.

Figure 4:
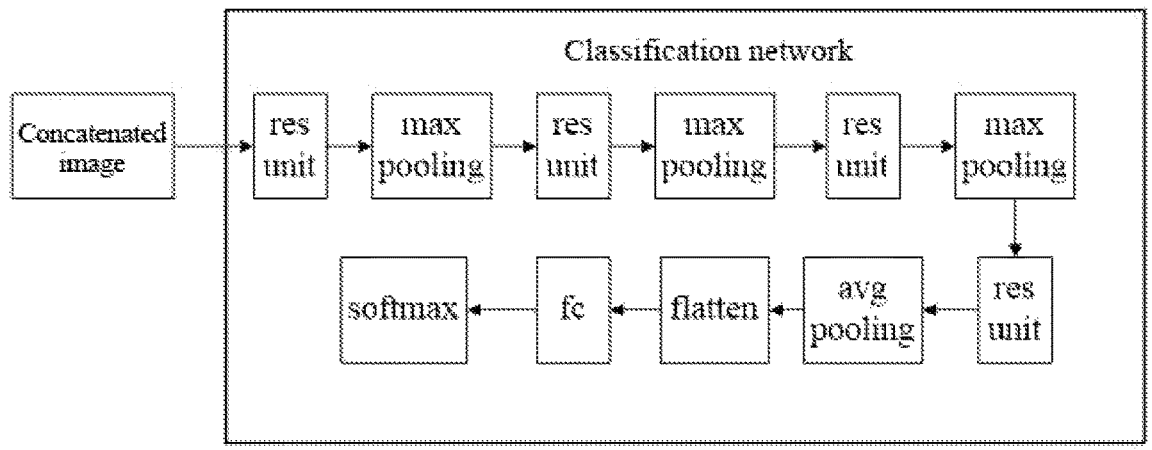
FIG. 4 is a schematic diagram of a classification network according to an embodiment of the present disclosure.

Since the quantity of samples of flawed products may be small, the classification network of the present embodiment adopts the resnet (Residual Network) network having shallow residuals as shown in FIG. 4. The resnet network can have relatively high classification performance with dozens of training images.

As shown in FIG. 4, the classification network of the present embodiment comprises four serially connected res units. Of course, the classification network may be set to include three or five serially connected res units. Typically, the quantity of res units is less than 6.

The quantity of convolution kernels of the convolutional layer in the first res unit is 64, and then the quantity of convolution kernels of the convolutional layer in each res unit is increased by two times. Every time a max pooling is passed, the length and width of the feature map are halved respectively. The final pooling layer is a global average pooling layer avg pooling. Finally, the classification results are output through fc and softmax.

In some embodiments, the loss function trained by the classification network adopts cross entropy plus L2 regularization term, and the setting of the initial learning rate of the network, the optimizer and other parameters can be determined according to requirements.

Figure 5:
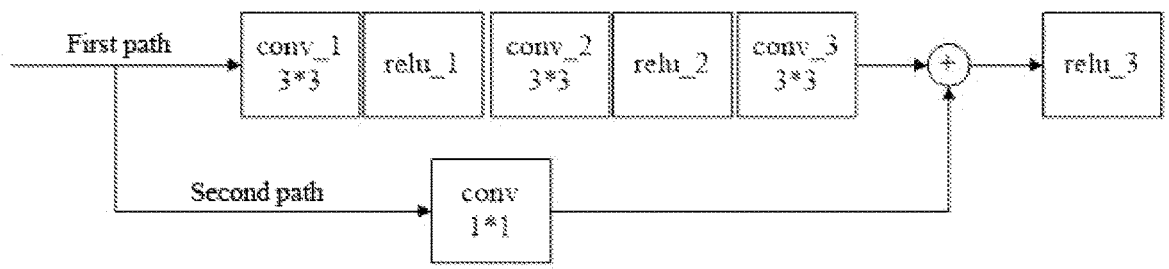
FIG. 5 is a schematic diagram of the structure of a convolutional layer in a classification network according to an embodiment of the present disclosure.

As shown in FIG. 5, each res unit which is set in constructing the classification network includes a first path and a second path.

The second path is set to include a convolution kernel conv, which is a 1*1 convolution kernel. The first path is set to include three serial convolution kernels cony: a first convolution kernel conv_1, a second convolution kernel conv_2, and a third convolution kernel conv_3. The output of conv_1 in the first path is connected to the first activation function relu_1, the output of relu_1 is connected to conv_2, the output of conv_2 is connected to the second activation function relu_2, the output of relu_2 is connected to conv_3, the output of conv_2 is superimposed with the output of cony in the second path and then connected to the third activation function relu_3. The conv_1, conv_2 and conv_3 are all 3*3 convolution kernels. Finally, the relu_3 is set to be connected to a max pooling corresponding to this res unit.

In this way, in the present embodiment, a segmentation network that can correctly identify a product defect and a defect type can be obtained only by small sample training through the step S2310.

Fifth Embodiment

Figure 6:
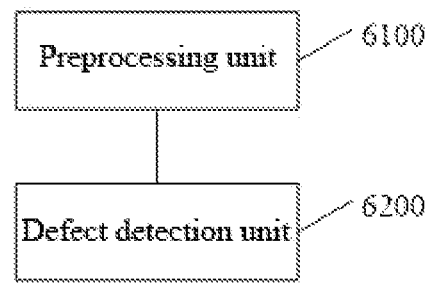
FIG. 6 is a block diagram of the structure of a product defect detection device according to an embodiment of the present disclosure.

The present embodiment further provides a product defect detection device. FIG. 6 is a block diagram of the structure of a product defect detection device according to an embodiment of the present disclosure. As shown in FIG. 6, the device in the present embodiment comprises:

a preprocessing unit 6100 configured to construct a defect detection framework including segmentation networks, a concatenating network and a classification network, and setting a quantity of the segmentation networks according to product defect types, wherein each segmentation network corresponds to a defect type; train the segmentation network by using a sample image of a product containing different defect types to obtain a segmentation network of a mask image capable of locating a position of each type of defect; concatenate the sample image with the mask image output by each segmentation network by using the concatenating network to obtain a concatenated image; and train the classification network by using the concatenated image to obtain a classification network capable of correctly identifying a product defect and a defect type; and a defect detection unit 6200 configured to, when performing product defect detection, input a product image acquired into the defect detection framework, and detect a product defect and a defect type existing in the product by using the segmentation networks, the concatenating network and the classification network.

In some embodiments, the preprocessing unit 6100 comprises a first training module which inputs multiple sample images containing different defect types into multiple segmentation networks respectively, segments each type of defect in the sample image by using a parallel structure composed of multiple segmentation networks, and obtains a mask image capable of locating a position of each type of defect.

The first training module specifically performs feature extraction and dimensionality reduction processing on the sample image by using a convolution part of each segmentation network to obtain a feature image associated with a defect type; and performs dimension increasing processing on the feature image by using an up-sampling part of each segmentation network to obtain a mask image of a position of a type of defect in the sample image.

In some embodiments, the preprocessing unit 6100 comprises an image processing module, which sets a size of the sample image to be a first preset size according to a morphological feature of the product defect, trains the segmentation network by using the sample image having the first preset size, outputs a mask image having the first preset size by the segmentation network, sets a size of the sample image and the mask image to be a second preset size according to classification performance of the classification network, and concatenates the sample image having the second preset size and the mask image having the second preset size; wherein the first preset size is greater than the second preset size.

When an alternative processing manner is adopted, the preprocessing unit 6100 may be further configured to keep the size of the sample image and the mask image unchanged, and concatenate channels of the sample image with channels of each mask image one by one, so that a quantity of channels of a concatenated image is equal to a sum of a quantity of channels of the sample image and a quantity of channels of all mask images.

In some embodiments, the preprocessing unit 6100 is further configured to construct the classification network including a residual unit for feature extraction, a pooling layer for reducing a size of a feature map, a flatten layer for reducing a dimension of a multi-dimensional feature map into a row vector, a fully connected layer for adjusting row vector to a column vector and a logistic regression layer for logical judgment;

wherein a predetermined quantity of serially connected residual units are set, each residual unit is connected to a pooling layer, a pooling layer connected to a final residual unit is a global average pooling layer; an input of the flatten layer is set to be connected to an output of the global average pooling layer; an input of the fully connected layer is set to be connected to an output of the flatten layer; and an input of the logistic regression layer is set to be connected to an output of the fully connected layer.

For the specific implementing mode of each unit and module in the device embodiment of the present disclosure, please refer to the related content of the method embodiment of the present disclosure, which will not be repeated here.

Sixth Embodiment

Figure 7:
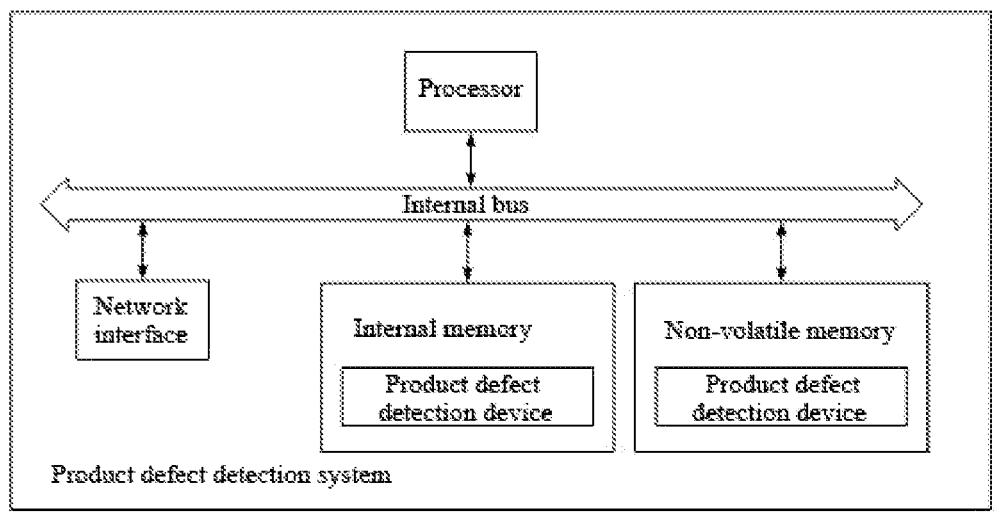
FIG. 7 is a block diagram of the structure of a product defect detection system according to an embodiment of the present disclosure.

FIG. 7 is a block diagram of the structure of a product defect detection system according to an embodiment of the present disclosure. As shown in FIG. 7, at the hardware level, the product defect detection system includes a processor, and optionally an internal bus, a network interface, and a memory. Among them, the memory may include an internal memory, such as high-speed random access memory (RAM), and may also include non-volatile memory, such as at least one disk memory.

The processor, network interface and memory can be connected to each other via an internal bus. The internal bus can be an ISA (Industry Standard Architecture) bus, a PCI (Peripheral Component Interconnect) bus or an EISA (Extended Industry Standard Architecture) bus, etc. The bus can be divided into address bus, data bus, control bus, etc. For ease of presentation, only one bidirectional arrow is shown in FIG. 7, but it does not mean that there is only one bus or one type of bus.

Memory is used to store programs. Specifically, the program may include program codes, and the program codes include computer executable instructions. The memory may include internal memory and non-volatile memory, and provide instructions and data to the processor.

The processor reads the corresponding computer program from the non-volatile memory into the internal memory and then runs it to form a product defect detection device on a logical level. The processor executes the program stored in the memory to implement the product defect detection method as described above.

The method performed by the product defect detection device disclosed in the embodiment shown in FIG. 7 of this specification can be applied to a processor or implemented by the processor. The processor may be an integrated circuit chip having signal processing capabilities. In the implementation process, the steps of the product defect detection method described above can be completed by integrated logic circuits (in the form of hardware) or instructions (in the form of software) in the processor. The processor may be a general-purpose processor including a central processing unit (CPU), a network processor (NP), etc.; it may also be a digital signal processor (DSP), an application specific dedicated integrated circuit (ASIC), a field-programmable gate array (FPGA) or other programmable logic devices, discrete gates or transistor logic devices, discrete hardware components, which can implement or execute the methods, steps, and logical block diagrams disclosed in the embodiments of this specification. The general-purpose processor may be a microprocessor or any conventional processor or the like. The steps of the method disclosed in the embodiments of this specification can be directly embodied as hardware and executed by a decoding processor, or executed by a combination of hardware in the decoding processor and software modules. The software module can be located in a storage medium well known in the art such as random access memory, flash memory, read-only memory, programmable read-only memory, or electrically erasable programmable memory, registers, etc. The storage medium is located in the memory, and the processor reads the information in the memory and cooperates with its hardware to complete the steps of the above product defect detection method in combination with.

The present disclosure further provides a computer readable storage medium.

The computer readable storage medium stores one or more computer programs. The one or more computer programs include instructions. When the instructions are executed by the processor, the product defect detection method as described above can be implemented.

In order to clearly describe the technical solutions of the embodiments of the present disclosure, in the embodiments of the present disclosure, words such as "first" and "second" are used to distinguish the same or similar items having basically the same function and effect. A person skilled in the art can understand that the words "first" and "second" are not intended to limit the quantity and execution order.

The above merely describe particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A product defect detection method, comprising:
   constructing a defect detection framework including segmentation networks, a concatenating network and a classification network, and setting a quantity of the segmentation networks according to product defect types, wherein each segmentation network corresponds to a defect type;
   training the segmentation networks respectively by using a sample image of a product containing different defect types to obtain a segmentation network of a mask image capable of locating a position of each type of defect;
   concatenating the sample image with the mask image output by each segmentation network by using the concatenating network to obtain a concatenated image;
   training the classification network by using the concatenated images to obtain a classification network capable of correctly identifying a product defect and a defect type; and
   when performing product defect detection, inputting a product image acquired into the defect detection framework, and detecting a product defect and a defect type existing in the product by using the segmentation networks, the concatenating network and the classification network.

2. The method according to claim 1, wherein training the segmentation networks respectively by using a sample image of a product containing different defect types comprises:
   inputting multiple sample images containing different defect types into multiple segmentation networks respectively; and
   segmenting each type of defect in the sample image by using a parallel structure composed of multiple segmentation networks, and obtaining a mask image capable of locating a position of each type of defect.

3. The method according to claim 2, wherein segmenting each type of defect in the sample image by using a parallel structure composed of multiple segmentation networks, and obtaining a mask image capable of locating a position of each type of defect comprises:
   performing feature extraction and dimensionality reduction processing on the sample image by using a convolution part of each segmentation network to obtain a feature image associated with a defect type; and
   performing dimension increasing processing on the feature image by using an up-sampling part of each segmentation network to obtain a mask image locating a position of a type of defect in the sample image.

4. The method according to claim 1, wherein training the segmentation networks respectively by using a sample image of a product containing different defect types to obtain a segmentation network of a mask image capable of locating a position of each type of defect further comprises:
   setting a size of the sample image to be a first preset size according to a morphological feature of the product defect, training the segmentation networks by using the sample image having the first preset size, and outputting a mask image having the first preset size by the segmentation network;
   concatenating the sample image with the mask image output by each segmentation network by using the concatenating network to obtain a concatenated image comprises:
   setting a size of the sample image and the mask image to be a second preset size according to classification performance of the classification network, and concatenating the sample image having the second preset size and the mask image having the second preset size; wherein the first preset size is greater than the second preset size.

5. The method according to claim 1, wherein concatenating the sample image with the mask image output by each segmentation network by using the concatenating network to obtain a concatenated image comprises:

keeping the size of the sample image and the mask image unchanged, and concatenating channels of the sample image with channels of each mask image one by one, so that a quantity of channels of a concatenated image is equal to a sum of a quantity of channels of the sample image and a quantity of channels of all mask images.

6. The method according to claim 1, wherein a method for constructing the classification network comprises:

constructing a classification network including a residual unit for feature extraction, a pooling layer for reducing a size of a feature map, a flatten layer for reducing a dimension of a multi-dimensional feature map into a row vector, a fully connected layer for adjusting a row vector to a column vector and a logistic regression layer for logical judgment;

specifically, setting a predetermined quantity of serially connected residual units, wherein each residual unit is connected to the pooling layer, and the pooling layer connected to a final residual unit is a global average pooling layer; setting an input of the flatten layer to be connected to an output of the global average pooling layer; setting an input of the fully connected layer to be connected to an output of the flatten layer; and setting an input of the logistic regression layer to be connected to an output of the fully connected layer.

7. The method according to claim 6, wherein setting a predetermined quantity of serially connected residual units comprises:

setting each convolutional layer to include a first path and a second path;

setting the second path to include a convolution kernel, and setting the first path to include three convolution kernels in series, wherein an output of a first convolution kernel in the first path is connected to a first activation function, an output of the first activation function is connected to a second convolution kernel, an output of the second convolution kernel is connected to a second activation function, an output of the second activation function is connected to a third convolution kernel, and an output of the third convolution kernel is superimposed with an output of a convolution kernel of the second path and then is connected to a third activation function; and setting the third activation function to be connected to a pooling layer corresponding to the residual unit.

8. The method according to claim 1, wherein the mask image is a binary image in which a pixel value of a region where a defect is located is a first value, and a pixel value of other regions is a second value;

alternatively, the mask image is a grayscale image in which a pixel value of a region where a defect is located is a pixel value of the region in the sample image, and a pixel value of other regions is a second value.

9. The method according to claim 1, wherein the quantity of the segmentation networks is set according to product defect types suitable for segmenting and locating by a segmentation algorithm.

10. A product defect detection system, comprising: a memory and a processor;

the memory stores computer executable instructions;

when the computer executable instructions are executed, the processor executes the product defect detection method according to claim 1.

11. The system according to claim 10, wherein training the segmentation networks respectively by using a sample image of a product containing different defect types comprises:

inputting multiple sample images containing different defect types into multiple segmentation networks respectively; and segmenting each type of defect in the sample image by using a parallel structure composed of multiple segmentation networks, and obtaining a mask image capable of locating a position of each type of defect.

12. The system according to claim 11, wherein segmenting each type of defect in the sample image by using a parallel structure composed of multiple segmentation networks, and obtaining a mask image capable of locating a position of each type of defect comprises:

performing feature extraction and dimensionality reduction processing on the sample image by using a convolution part of each segmentation network to obtain a feature image associated with a defect type; and performing dimension increasing processing on the feature image by using an up-sampling part of each segmentation network to obtain a mask image locating a position of a type of defect in the sample image.

13. The system according to claim 10, wherein training the segmentation networks respectively by using a sample image of a product containing different defect types to obtain a segmentation network of a mask image capable of locating a position of each type of defect further comprises:

setting a size of the sample image to be a first preset size according to a morphological feature of the product defect, training the segmentation networks by using the sample image having the first preset size, and outputting a mask image having the first preset size by the segmentation network;

concatenating the sample image with the mask image output by each segmentation network by using the concatenating network to obtain a concatenated image comprises:

setting a size of the sample image and the mask image to be a second preset size according to classification performance of the classification network, and concatenating the sample image having the second preset size and the mask image having the second preset size; wherein the first preset size is greater than the second preset size.

14. The system according to claim 10, wherein concatenating the sample image with the mask image output by each segmentation network by using the concatenating network to obtain a concatenated image comprises:

keeping the size of the sample image and the mask image unchanged, and concatenating channels of the sample image with channels of each mask image one by one, so that a quantity of channels of a concatenated image is equal to a sum of a quantity of channels of the sample image and a quantity of channels of all mask images.

15. The system according to claim 10, wherein a method for constructing the classification network comprises:

constructing a classification network including a residual unit for feature extraction, a pooling layer for reducing a size of a feature map, a flatten layer for reducing a dimension of a multi-dimensional feature map into a row vector, a fully connected layer for adjusting a row vector to a column vector and a logistic regression layer for logical judgment;

specifically, setting a predetermined quantity of serially connected residual units, wherein each residual unit is connected to the pooling layer, and the pooling layer connected to a final residual unit is a global average pooling layer; setting an input of the flatten layer to be connected to an output of the global average pooling layer; setting an input of the fully connected layer to be connected to an output of the flatten layer; and setting an input of the logistic regression layer to be connected to an output of the fully connected layer.

16. The system according to claim 15, wherein setting a predetermined quantity of serially connected residual units comprises:

setting each convolutional layer to include a first path and a second path;

setting the second path to include a convolution kernel, and setting the first path to include three convolution kernels in series, wherein an output of a first convolution kernel in the first path is connected to a first activation function, an output of the first activation function is connected to a second convolution kernel, an output of the second convolution kernel is connected to a second activation function, an output of the second activation function is connected to a third convolution kernel, and an output of the third convolution kernel is superimposed with an output of a convolution kernel of the second path and then is connected to a third activation function; and setting the third activation function to be connected to a pooling layer corresponding to the residual unit.

17. A product defect detection device, comprising:

a preprocessing unit configured to construct a defect detection framework including segmentation networks, a concatenating network and a classification network, and set a quantity of the segmentation networks according to product defect types, wherein each segmentation network corresponds to a defect type; train the segmentation network by using a sample image of a product containing different defect types to obtain a segmentation network of a mask image capable of locating a position of each type of defect; concatenate the sample image with the mask image output by each segmentation network by using the concatenating network to obtain a concatenated image; and train the classification network by using the concatenated images to obtain a classification network capable of correctly identifying a product defect and a defect type; and a defect detection unit configured to, when performing product defect detection, input a product image acquired into the defect detection framework, and detect a product defect and a defect type existing in the product by using the segmentation networks, the concatenating network and the classification network.

18. The device according to claim 17, wherein the preprocessing unit comprises a first training module which inputs multiple sample images containing different defect types into multiple segmentation networks respectively, segments each type of defect in the sample image by using a parallel structure composed of multiple segmentation networks, and obtains a mask image capable of locating a position of each type of defect.

19. The device according to claim 17, wherein the preprocessing unit comprises an image processing module, which sets a size of the sample image to be a first preset size according to a morphological feature of the product defect, trains the segmentation network by using the sample image having the first preset size, outputs a mask image having the first preset size by the segmentation network, sets a size of the sample image and the mask image to be a second preset size according to classification performance of the classification network, and concatenates the sample image having the second preset size and the mask image having the second preset size; wherein the first preset size is greater than the second preset size; or the preprocessing unit is further configured to keep the size of the sample image and the mask image unchanged, and concatenate channels of the sample image with channels of each mask image one by one, so that a quantity of channels of a concatenated image is equal to a sum of a quantity of channels of the sample image and a quantity of channels of all mask images.

20. The device according to claim 17, wherein the preprocessing unit is further configured to construct the classification network including a residual unit for feature extraction, a pooling layer for reducing a size of a feature map, a flatten layer for reducing a dimension of a multi-dimensional feature map into a row vector, a fully connected layer for adjusting row vector to a column vector and a logistic regression layer for logical judgment;

wherein a predetermined quantity of serially connected residual units are provided, each residual unit is connected to a pooling layer, a pooling layer connected to a final residual unit is a global average pooling layer; an input of the flatten layer is set to be connected to an output of the global average pooling layer; an input of the fully connected layer is set to be connected to an output of the flatten layer; and an input of the logistic regression layer is set to be connected to an output of the fully connected layer.

* * * * *